United States Patent
Golovkin et al.

(10) Patent No.: US 10,460,099 B2
(45) Date of Patent: Oct. 29, 2019

(54) SYSTEM AND METHOD OF DETECTING MALICIOUS CODE IN FILES

(71) Applicant: AO Kaspersky Lab, Moscow (RU)

(72) Inventors: Maxim Y. Golovkin, Moscow (RU); Alexey V. Monastyrsky, Moscow (RU); Vladislav V. Pintiysky, Moscow (RU); Mikhail A. Pavlyushchik, Moscow (RU); Vitaly V. Butuzov, Moscow (RU); Dmitry V. Karasovsky, Moscow (RU)

(73) Assignee: AO Kaspersky Lab, Moscow (RU)

( * ) Notice: Subject to any disclaimer, the term of this patent is extended or adjusted under 35 U.S.C. 154(b) by 158 days.

(21) Appl. No.: 15/431,162

(22) Filed: Feb. 13, 2017

(65) Prior Publication Data
US 2018/0068115 A1    Mar. 8, 2018

(30) Foreign Application Priority Data

Sep. 8, 2016  (RU) ................ 2016136224

(51) Int. Cl.
*G06F 3/0484* (2013.01)
*G06F 21/53* (2013.01)
*G06F 21/56* (2013.01)

(52) U.S. Cl.
CPC ............ *G06F 21/53* (2013.01); *G06F 21/566* (2013.01); *G06F 2221/034* (2013.01)

(58) Field of Classification Search
CPC .. G06F 21/53; G06F 21/566; G06F 2221/034; G06F 21/56; G06F 17/30; G06F 9/455
See application file for complete search history.

(56) References Cited

U.S. PATENT DOCUMENTS

| 7,568,233 B1 | 7/2009 | Szor et al. |
| 7,664,626 B1 | 2/2010 | Ferrie |
| 7,779,472 B1 | 8/2010 | Lou |

(Continued)

FOREIGN PATENT DOCUMENTS

WO    2016/093182 A1    6/2016

OTHER PUBLICATIONS

Tomer Teller et al. "Enhancing Automated Malware Analysis Machines with Memory Analysis" retrieved from the Internet on Dec. 4, 2017.

*Primary Examiner* — Lynn D Feild
*Assistant Examiner* — Jessica J South
(74) *Attorney, Agent, or Firm* — Arent Fox LLP; Michael Fainberg

(57) ABSTRACT

Disclosed are system and method for detecting malicious code in files. One exemplary method comprises: intercepting, by a processor, one or more application program interface (API) calls during an execution of a process launched from a file of a computing device; determining and detecting, by the processor, a presence of an exit condition of the process; in response to detecting the exit condition, identifying one or more signatures of a first type and transferring one or more saved memory dumps of the computing device to an emulator for execution; and determining and identifying a malicious code in the file in response to detecting one or more signatures of a second type based at least upon execution results of the transferred memory dumps of the computing device.

20 Claims, 4 Drawing Sheets

(56) References Cited

U.S. PATENT DOCUMENTS

| | | |
|---|---|---|
| 7,814,544 B1 | 10/2010 | Wilhelm |
| 9,092,625 B1* | 7/2015 | Kashyap ............... G06F 21/566 |
| 9,355,247 B1 | 5/2016 | Thioux et al. |
| 10,341,355 B1* | 7/2019 | Niemoller ............. H04L 63/105 |
| 2010/0031353 A1* | 2/2010 | Thomas .............. G06F 11/3604 |
| | | 726/22 |
| 2011/0041179 A1 | 2/2011 | Ståhlberg |
| 2012/0079596 A1 | 3/2012 | Thomas et al. |
| 2013/0091571 A1* | 4/2013 | Lu ........................ G06F 21/563 |
| | | 726/23 |
| 2013/0227300 A1 | 8/2013 | Golovkin |
| 2014/0283058 A1* | 9/2014 | Gupta ................... G06F 21/566 |
| | | 726/23 |
| 2015/0347745 A1 | 12/2015 | Ryou et al. |

\* cited by examiner

SYSTEM AND METHOD OF DETECTING MALICIOUS CODE IN FILES

CROSS-REFERENCE TO RELATED APPLICATIONS

The present application claims benefit of priority under 35 U.S.C. 119(a)-(d) to a Russian Application No. 2016136224 filed Sep. 8, 2016, which is incorporated by reference herein.

FIELD OF TECHNOLOGY

The disclosure relates generally to the field of data security, and more specifically to systems and methods of detecting malicious code in files.

BACKGROUND

Traditional signature analysis may not always able to detect malicious files, especially polymorphic viruses, altered versions of malicious files, and shellcodes. Therefore, modern antivirus applications additionally perform a scan using a so-called "sandbox"—a computer environment for safe execution of processes. The sandbox can be realized, for example, in the form of a virtual machine, on the basis of a partial virtualization of the file system and the registry, on the basis of rules of access to the file system and registry, or on the basis of a hybrid approach. The file being scanned is executed in the sandbox. Events which occur as a result of the execution of the process launched from the file may be saved in a log by means of an intercepting of the various procedures being executed by both the process and the operating system (OS). The antivirus application may then analyze the resulting log. The log usually saves the API (application programming interface) function calls which have been made by the mentioned process during the execution, and also the returns from the called API functions (transfer of control at the return address). The execution of a file in a sandbox usually occurs within a limited period of time (up to several dozen seconds), since the execution of the file in the sandbox and the intercepting of the API function calls by the antivirus application substantially slows down the speed of execution of the file. At the same time, when a file containing a shellcode is executed in a sandbox, its detection by analysis of the API function call logs may be difficult. This is because the shellcode may be loaded into the memory of the process, but the execution of the process in the sandbox was terminated earlier than when control should have been transferred to the memory section containing the shellcode. In this case, a need arises to preserve and analyze the memory dumps.

Analysis of the prior art leads to the conclusion that it may be ineffective and in some instances impossible to employ the previous technologies, whose drawbacks are solved by the present invention, namely, a system and method for detection of malicious code in a file.

SUMMARY

Disclosed are systems and methods for detecting malicious code in files. In one exemplary aspect, a computer-implemented method for detecting malicious code in files, comprising: intercepting, by a processor, one or more application program interface (API) calls during an execution of a process launched from a file of a computing device; determining and detecting, by the processor, a presence of an exit condition of the process; in response to detecting the exit condition, identifying one or more signatures of a first type and transferring one or more saved memory dumps of the computing device to an emulator for execution; and determining and identifying a malicious code in the file in response to detecting one or more signatures of a second type based at least upon execution results of the transferred memory dumps of the computing device.

In another exemplary aspect, the method further comprises executing the process launched from the file in a virtual machine of the computing device via a control of an antivirus application installed on the computing device; and determining and storing successive records of the intercepted API calls in a first log of the virtual machine of the computing device. Determining and detecting, by the processor, the presence of the exit condition of the process comprises detecting at least one of: an indication that the process has been completed; a specified period of time has elapsed; a number of instructions executed by the process has exceeded a selected threshold; or a number of detected suspicious events has exceeded a selected threshold.

In yet another exemplary aspect, the method further comprises detecting one or more suspicious events occurring during the execution of the process based on the intercepted API calls; and in response to detecting the one or more suspicious events and storing the successive records of the intercepted API calls in the first log, storing a memory dump of the process in a database of the virtual machine of the computing device. Identifying the one or more signatures of the first type is performed based at least on the successive records in the first log, each signature of the first type comprising a data structure containing at least one record having information relating to the intercepted API calls or the detected one or more suspicious events.

In another exemplary aspect, executing the transferred one or more saved memory dumps of the computing device in the emulator comprises: disassembling one or more executable codes contained in the one or more saved memory dumps; executing the one or more executable codes in a virtual environment of the emulator; determining jumps to addresses of the one or more API calls during the execution of the one or more executable codes; and maintaining in succession in a second log records of the one or more API calls.

Each record in the second log contains information relating to: a name of an API function called; a unique identifier (PID) of a process launched from a corresponding file; a unique identifier (TID) of a thread executing instructions of address space of the process; and a set of arguments of the API function. The second log is configured to maintain and record an execution trace of the emulator including a uninterrupted sequences of instructions being executed on the processor and snapshots of internal states of the processor when executing each instruction. The one or more signatures of the second type comprise a data structure containing at least one of the records in the second log: information about the one or more API calls, processor instructions, and records of snapshots of the internal states of the processor.

In accordance with another exemplary aspect, a system for detecting malicious code in files, comprising: at least one processor configured to: intercept one or more application program interface (API) calls during an execution of a process launched from a file of a computing device; determine and detect a presence of an exit condition of the process; in response to detecting the exit condition, identify one or more signatures of a first type and transfer one or more saved memory dumps of the computing device to an emulator for execution; and determine and identify a malicious code in the file in response to detecting one or more signatures of a second type based at least upon execution results of the transferred memory dumps of the computing device.

Furthermore, in accordance with yet another exemplary aspect, a non-transitory computer readable medium storing thereon computer executable instructions for detecting malicious code in files, including instructions for: intercepting, by a processor, one or more application program interface (API) calls during an execution of a process launched from a file of a computing device; determining and detecting, by the processor, a presence of an exit condition of the process; in response to detecting the exit condition, identifying one or more signatures of a first type and transferring one or more saved memory dumps of the computing device to an emulator for execution; and determining and identifying a malicious code in the file in response to detecting one or more signatures of a second type based at least upon execution results of the transferred memory dumps of the computing device.

The above simplified summary of example aspects of the invention serves to provide a basic understanding of the invention. This summary is not an extensive overview of all contemplated aspects, and is intended to neither identify key or critical elements of all aspects nor delineate the scope of any or all aspects of the invention. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method, and computer program product for detecting malicious code in files. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
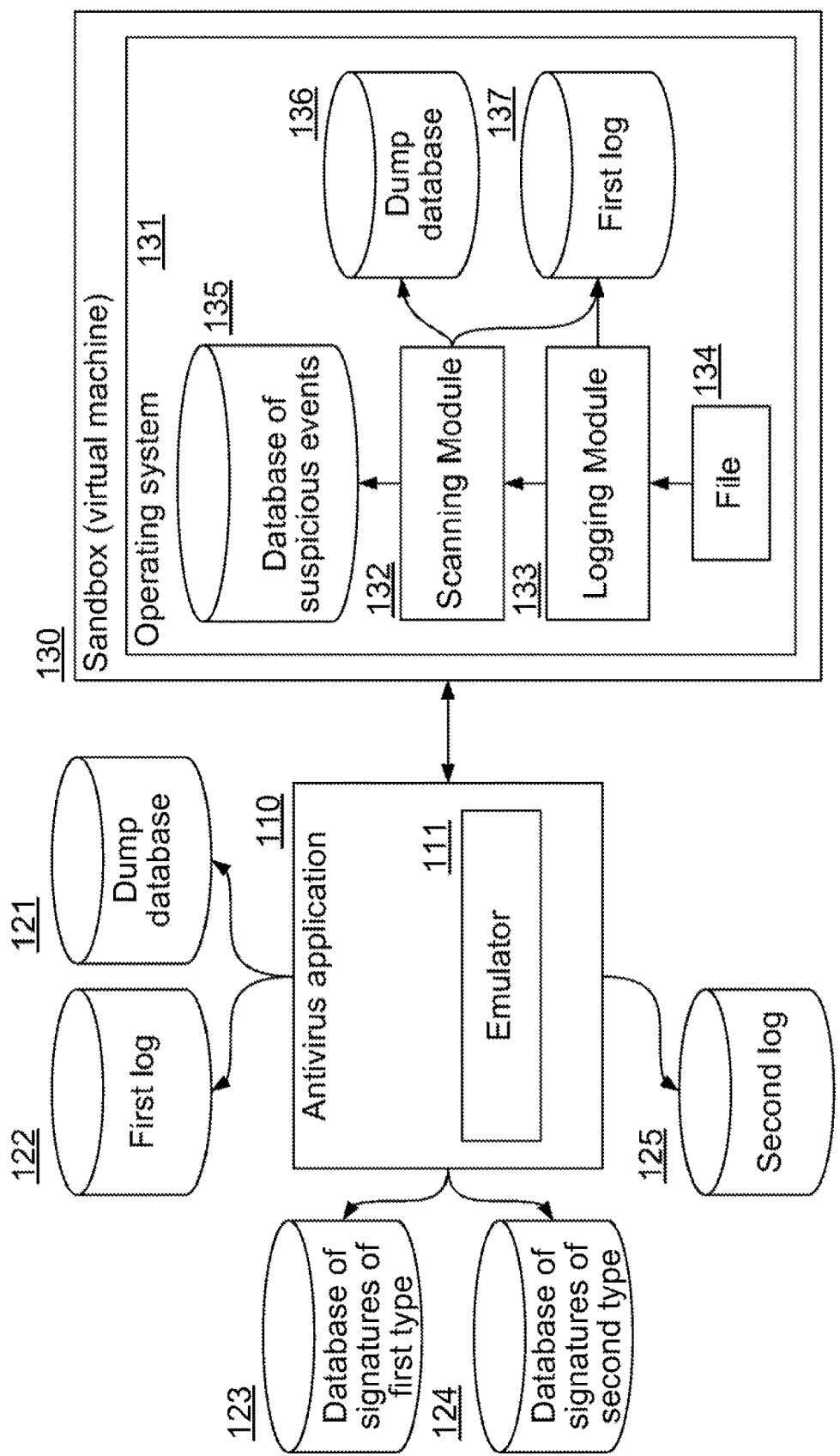
FIG. 1 shows an exemplary system for detection of malicious code in a file, according to aspects of the invention.

FIG. 1 shows an exemplary computer system for detection of malicious code in a file, according to aspects of the invention. In one example, the malicious code may include a shellcode. A shellcode is usually embedded in the memory of a process loaded from a file, after which control is transferred to it, for example, by buffer overflow, including buffer overflow on the stack. As a result of the execution of the shellcode, a hacker can perform malicious actions on the computer, for example, carry out a loading of an executable malicious file from the network and save it on the victim's computer. A sandbox 130 may be a computer environment for the safe execution of processes. The sandbox may be realized, for example, in the form of a virtual machine, on the basis of a partial virtualization of the file system and registry, on the basis of rules of access to the file system and registry, or on the basis of a hybrid approach. FIG. 1 presents a sample realization of a sandbox in the form of a virtual machine on which an operating system (OS) 131 has been installed. The sandbox 130 may be configured to execute a process launched from a file 134 under the control of an antivirus application 110. It should be noted that the file 134 may be a file of any given data format and may contain any given data. For example, the file 134 may be a file of office applications (such as Microsoft Word, Excel, PowerPoint, Access; Adobe Acrobat and so on), which are the most subject to vulnerabilities. Accordingly, in this case the process launched from the file 134 will be a process of the corresponding application (such as the process WINWORD.EXE for the Microsoft Word application). In another example, the file 134 may be an executable file, such as a PE (Portable Executable) file.

Within the sandbox is contained a scanning module 132 connected with a logging module 133. During the execution of the process, the logging module 133 may intercept the API function calls and successively enter records thereof in a first log 137, likewise situated in the sandbox 130. At the moment of intercepting of the API function calls by the logging module 133, the scanning module 132 may save the memory dumps of the process in a dump database 136.

In an example, each record of the first log 137 on the API function calls may contain at least the following information: the name of the function called; the unique identifier (PID) of the process launched from the mentioned file 134; the unique identifier (TID) of the thread executing the instructions of the address space of the process; and the set of arguments of the mentioned function.

The logging module 133 may also send the intercepted API function calls to the scanning module 132, which on the basis of the API function calls determines suspicious events occurring during the execution of the process from a list of suspicious events, which are stored in a database of suspicious events 135. A suspicious event may include an event occurring as a result of calls by the process of API functions and being peculiar to the malicious code being executed. Thus, the suspicious event may be determined on the basis of the API function calls, snapshots of the internal state of the processor, the registries of the processor, and the stack contents. For example, a suspicious event may be an API function call from a list of suspicious API functions, such as WinExec, CreateProcess, GetFileSize and others. The list of suspicious events may be previously composed by an antivirus analyst and placed in the database of suspicious events 135. Other detailed examples of suspicious events may be considered below.

The scanning module 132 may also serve to enter records on suspicious events in the first log 137 and to save the memory dump of the process in the dump database 136 at the moment of detection of the suspicious event or at the moment of interception of the API function call by the logging module 133. In one example, the scanning module 132 may save the memory dump of the process starting from the starting address at which the suspicious event or the API function call occurred, evened out with the bottom page border, to the ending address, increased by a specified number relative to the starting address, upon detection of the suspicious event or upon interception of the API function call. For example, the memory dump may contain 16 pages, starting with the address at which the suspicious event or API function call occurred. In another example, the starting memory address may be additionally decreased by a specified number. In yet another example, for a more accurate calculation of the starting and ending addresses, the procedure ZwQueryVirtualMemory may be called up, which may return information on the memory region and, in particular, if it is successfully worked through, one may obtain the base address of the region and the size of the region. In this case, the starting address of the memory dump will be taken to be the maximum value from the base address of the memory region and a previously determined starting address of the memory dump. And the ending address of the memory dump may be determined and calculated as being the minimum value from the previously calculated value of the ending address of the memory dump and the base address of the memory region, increased by the size of the memory region.

In accordance with some aspects of the invention, the scanning module 132 may be additionally configured to save the memory dump of the process at the moment of completion of its execution in the sandbox 130. In yet another example, the scanning module 132 may be additionally configured to save the context of the process at the moment of completion of the execution of the process in the sandbox, the antivirus application 110 using the saved context of the process during the execution on an emulator 111 of the memory dump of the process. The scanning module 132 may also be additionally configured to save the context of the process upon detection of a suspicious event, the antivirus application 110 using the saved context of the process during the execution on an emulator 111 of the memory dump of the process corresponding to the context of the process.

The scanning module 132 may be configured to check the condition of exit after execution of the previous step (saving of the memory dump). In one example, the exit condition may include at least one of the following: the process has been completed; a specified period of time has elapsed; the previous steps have been executed for a specified number of repetitions (such as 3 times); the number of instructions executed by the process has exceeded a specified threshold of the number of instructions (such as 100000 instructions); or the number of suspicious events as determined by the scanning module has exceeded a specified threshold of the number of suspicious events (such as 3 suspicious events).

Figure 2:
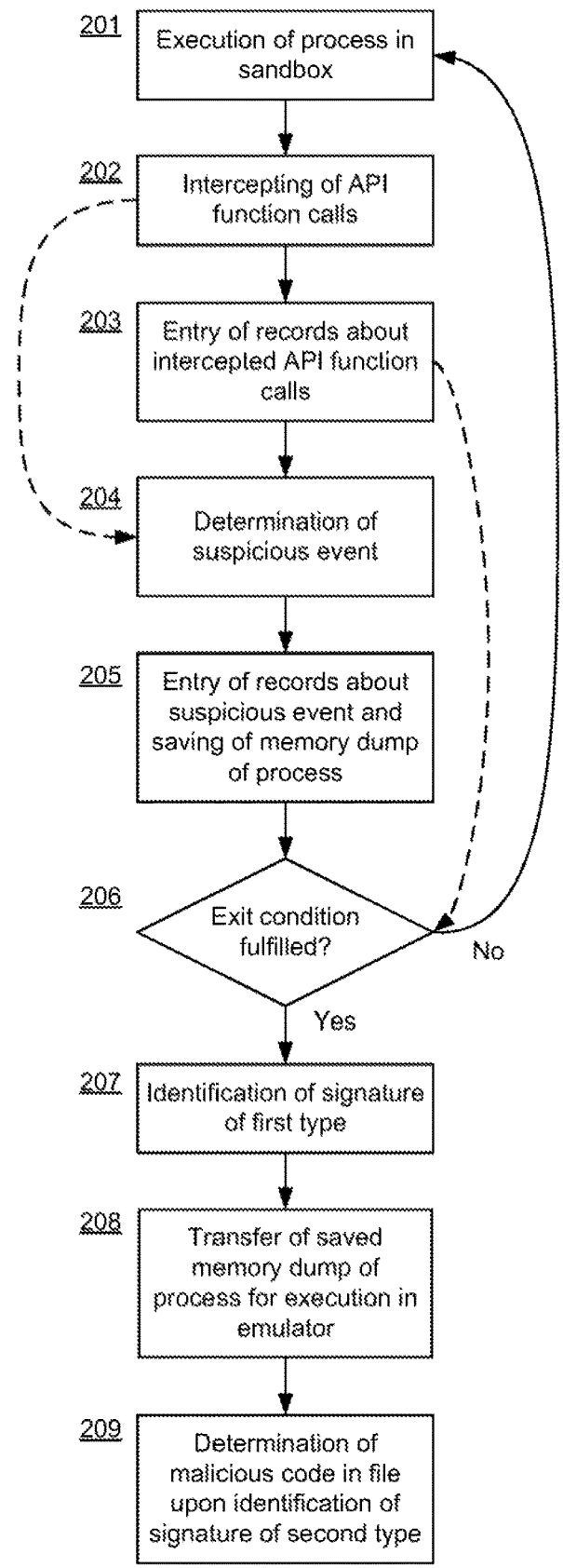
FIG. 2 shows an exemplary method for detection of malicious code in a file, according to aspects of the invention.

If the exit condition was not fulfilled, the scanning module 132 may be configured to initiate a repeating of the previous steps (see more details in the description for FIG. 2).

If the exit condition was fulfilled, i.e., the execution of the process launched from the file 134 was completed in the sandbox 130, the antivirus application 110 may save the records of the first log 137, contained in the sandbox, in a first log 122, contained in the operating system in which the antivirus application 110 is running. The records of the dump database 136 may be saved in the dump database 121.

In yet another example, the logging module 133 may perform an intercepting and an entering in the first log 137 of records containing information on the system calls responsible for working with a network, a registry, the file system, the RAM, the processes and the threads.

It should be noted that, when the logging module 133 may intercept the API function calls, the logging module 133 may have access to the stack of calls and to the instructions being executed on the processor. In an example, the logging module 133 may save in the first log 137 and send to the scanning module 132 the records on exceptional situations and the instructions being executed on the processor.

A suspicious event may include, for example, at least one of the following:
 calling an API function from the list of suspicious API functions (for example, the list may contain the following API functions: WinExec, CreateProcess, GetFileSize);
 the occurrence of an exceptional situation in the course of executing the process;
 repeated (for a specified number of times) allocation of dynamic memory by the process (such as 200 times);
 execution by the process of program code on the stack;
 absence of a call instruction before a ret instruction;
 alteration by the process of the exception handler;
 violation of the access rights when executing a call instruction; or
 the stack pointer of the process has gone beyond the borders of the region as indicated in the TEB (thread environment block).

For example, the event "absence of a call instruction before a ret instruction" may be a suspicious event, since after every call instruction (transfer of control to the procedure with saving of the address of the return point in the stack) there should come a ret instruction (return of control to the calling program at the return address saved in the stack).

In yet another example, the logging module 133 may be configured to identify the following exceptional situations:
 violation of the access rights when executing a call instruction;
 violation of the access rights when writing to memory;
 violation of the access rights when reading from memory at the program counter address, and also at addresses which match the program counter address within a given accuracy;
 violation of the policy to prevent data execution;
 buffer overflow on the stack;
 damage to the heap (heap corruption);
 an attempt to execute a forbidden, incorrect or privileged instruction.

For example, the logging module 133 may identify an exceptional situation of "violation of the access rights when writing to memory" upon analysis of the contents of the registry, the system structures, the stack of calls upon interception of the API function call (KiUserExceptionDispatcher).

The antivirus application 110 may contain in its makeup an emulator 111 and it is configured to identify in the first log 122 one or more signatures of a first type from a number of signatures of the first type, a list of which is contained in a database of signatures of the first type 123. A signature of the first type may include a data structure which may contain at least one of the records: information about an API function call, information about a suspicious event.

In another example, a signature of the first type may additionally contain conditions imposed on other records of this same signature—API function calls and information about a suspicious event. Such conditions may include, for example: checking of the number of records of the signature, checking of the sequence of the records of the signature, and so forth.

After identifying a signature of the first type, the antivirus application 110 may transfer at least one saved memory dump for execution to the emulator 111. The emulator 111 may disassemble the executable code contained in the memory dumps and execute it in its virtual environment. During the execution, the emulator 111 may determine the jumps to addresses of the API function calls (for example, the CreateFile call operator, transferring control to the CreateFile API function). Next, the emulator 111 may enter in succession in a second log 125 the records on the API function calls.

In one exemplary aspect, every record of the second log 125 on the API function calls may contain the following information: the name of the function called; the unique identifier (PID) of the process launched from the mentioned file 134; the unique identifier (TID) of the thread executing the instructions of the address space of the process; the set of arguments of the mentioned function.

In one exemplary aspect, the antivirus application 110 may be additionally configured to write the execution trace of the process into the second log 125 during the execution of the process on the emulator 111. The execution trace of the process may contain the uninterrupted sequence of instructions being executed on the processor and snapshots of the internal state of the processor when executing each instruction.

In yet another example, only the instructions pertaining to the process launched from the file 134 being checked may be selected from the execution trace. The instructions pertaining to the execution of processes of the operating system may be removed from the execution trace of the process.

The antivirus application 110 may determine a malicious code (such as a shellcode) in the file 134 upon identification in the second log 125 of one or more signatures of a second type from a database of signatures of the second type 124. A signature of the second type may include a data structure containing at least one of the records: information about API function calls, processor instructions, and records of snapshots of the internal state of the processor. In another example, a signature of the second type may include one or more of the following events: obtaining of addresses of descriptors of the system libraries (such as kernel32.dll, ntdll.dll); allocation of memory; reading of system structures (process environment block—PEB); and successive obtaining of file descriptors.

An event of process access to memory may be determined from the execution trace of the process: if it contains an instruction of type "mov eax, [ebx]", for example:

| "mov | eax, fs:[00000030] |
| mov | eax, [eax][0C] |
| mov | eax, [eax][0C] |
| mov | edx, eax |
| cmp | w,[eax][2C], 00018" |

In yet another example, a signature of the second type may contain the following record of the execution trace of the process:

```
#ReadModuleMemory(0 -> "USER32.dll",77d83452, "UserRegisterWowHandlers" +
0x2,accessor eip - 10002315);
> [0x77d83452] = 0x00005068
10002315        66 3B 10          cmp dx, [eax]
EAX: 77D83452 EBX: 00000000 ECX: 77D836A0 EDX: 000040C7 ESI: 77D51324
EDI: 77D5025E EBP: 00624FB8 ESP: 00624F5C EIP: 10002318 EFLAGS: 00000297
CS: 001B DS: 0023 ES: 0023 SS: 0023 FS: 003B GS: 0000 Flags: .......I.S..A.P.C
Stack:
00624F5C CB 1C 00 10-01 00 00 00|B0 4F 62 00-30 00 00 00 Ё .......°Ob.0...
00624F6C 23 00 00 00-20 22 00 10|00 00 00 00-00 00 00 00 #... "..........
FS:[0]:
00625000 EC 4F 62 00
```

The above-indicated record of the execution trace of a process may signify that a reading of memory has taken place at the address USER32.dll (the register EAX contains the address of the library USER32.dll).

In other exemplary aspects, a signature of the second type may contain records containing information about API function calls and processor instructions and records of snapshots of the internal state of the processor at the same time.

In yet another exemplary aspect, a signature of the second type may additionally contain conditions imposed on other records of this same signature—API function calls, processor instructions and records of snapshots of the internal state of the processor. Such conditions may include, for example: checking of the number of records of the signature, checking of the sequence of the records of the signature, and so forth.

Examples of such signatures of the second type containing the aforementioned conditions may be the following: a call of the API function GetFileSize was executed 10 times; after the call of the API function WriteFile (writing to file) there will appear a call of the API function WinExec (launching of a file for execution); reading from memory at address user32.dll followed by reading from memory at address kernel32.dll; creating by the process launched from the file 134 of a malicious file and adding it to the startup; and the executable process has copied the file 134 from which it was launched.

Besides API function calls, the logging module 133 may also carry out an interception and subsequent saving in the first log 137 of records containing information about the following objects: procedures for transfer of control at a return address from API functions; direct calls of Windows NT Native API functions; returns from Windows NT Native API functions; events of turning off or rebooting the computer system; and exceptional situations occurring in a process.

In on exemplary aspect, the emulator 111 may be configured to enter into the second log 125 one or more records containing information about the reading of system structures (process environment block—PEB) and the obtaining of addresses of descriptors of system libraries (such as kernel32.dll, ntdll.dll).

In another exemplary aspect, the emulator 111 may be configured to enter into the second log 125 records containing information about system calls responsible for operations working with one or more of the following objects: the network; the registry; the file system (such as fopen( ), create( )); the RAM; and the processes and threads.

In the above-described examples, the logging module 133 may be configured to obtain information about the system calls in one of the following ways: by intercepting the system calls; with the use of OS kernel notification mechanisms; and by embedding a driver in the stack of OS drivers.

The emulator 111 may obtain information about system calls at control transfer addresses.

FIG. 2 shows an exemplary method for detection of malicious code in a file (such as a shellcode). In step 201, a process launched from a file 134 may be executed under control of the antivirus application 110 with the use of a sandbox 130. Next, in step 202, the logging module 133 may be configured to intercept API function calls during the execution of the process. In step 203, the logging module 133 may be configured to enter successively records about the intercepted API function calls in the first log 137.

Next, in step 204, the scanning module 132 may be configured to determine a suspicious event occurring during the execution of the process on the basis of the API function calls intercepted by the logging module 133 and enter a record about the suspicious event in the first log 137.

In step 205, the scanning module 132 may be configured to save the memory dump of the process in a dump database 136 after the saving in step 203 of the records about the intercepted API function calls, and also after the suspicious event determined in step 204.

In one exemplary aspect, after step 203 there may follow a step 206, skipping over steps 204-205. In this case, there will be saved in the first log 137 only records containing information about API function calls. In another example, it is possible to omit step 203, and thus after step 202 comes step 204. In this same instance, only records containing information about identified suspicious events may be saved in the first log 137.

As a result, in step 206 the scanning module 132 may be configured to verify the exit condition and, if this has not been fulfilled, initiate a repetition of steps 201-205. But if the exit condition has been fulfilled, the execution of the method continues at step 207. The exit condition may include at least one of the following:
  i. the process has been completed;
  ii. a specified period of time has elapsed;
  iii. steps 201-205 have been executed for a specified number of repetitions;
  iv. the number of instructions executed by the process has exceeded a specified threshold of the number of instructions; or
  v. the number of suspicious events as determined by the scanning module has exceeded a specified threshold of the number of suspicious events.

In one exemplary aspect, in step 206 upon fulfillment of one of the exit conditions numbered ii.-v., the antivirus application 110 may save the state of the sandbox 130. If exit condition i. has occurred, there is no need to save the state of the sandbox 130, since the process has been completed. On the example of a virtual machine, the instantaneous snapshot of the virtual machine will be saved, including the contents of the memory of the virtual machine, the registers of the processor, and so forth. If in step 209 the antivirus application 110 has not identified a signature of the second type, the file 134 will be sent once more for execution in the sandbox 130 using the saved state, i.e., steps 201-205 will be carried out until the exit condition occurs in step 206. For example, steps 201-205 will be performed once until the detection of a first suspicious event, then the execution in the sandbox 130 was halted for the purpose of additional analysis of the file 134 in the emulator 111. However, if the emulator 111 was not able to discover a malicious code in the file 134, the execution of the file 134 in the sandbox 130 may continue until the onset of the following exit condition (for example, the next suspicious event is determined or the process is completed). As such, it may be possible to increase the speed of execution of the antivirus scan, since the exit condition is the determination in step 204 of a first suspicious event, without waiting for the execution of the process to be completed or a specified time period to elapse. At the same time, the quality of the determination of malicious code in the file 134 is not decreased, since if need be steps 201-205 will be repeated.

In yet another exemplary aspect, the suspicious events may have a different weight, which may be assigned by the scanning module 132. For example, exceptional situations may have a weight of 1, while an API function call from the list of suspicious API functions a weight of 2. In this case, the weight of the suspicious event may be used, for example, to determine the exit condition. Thus, the exit condition may include the following: a suspicious event with weight of 2 or several suspicious events with a combined weight of 2 has been detected, i.e., the combined weight of the suspicious events as determined by the scanning module 132 exceeds a specified value.

In another exemplary aspect, after completion of the execution of the process in the sandbox 130, the scanning module 132 may additionally save the memory dump of the process at the moment of completion of its execution. The scanning module 132 may additionally save the context of the process at the moment of completion of its execution after the execution of the process in the sandbox 130 has been completed. The antivirus application 110 may be configured to use the saved context of the process during the execution on the emulator of the memory dump of the process in step 208, which will be described below.

In yet another exemplary aspect, upon detection of a suspicious event the context of the process (at the moment of detection of the suspicious event) may be additionally saved, the antivirus application 110 using the saved context of the process during the execution on the emulator 111 of the memory dump of the process corresponding to the context of the process, in step 208.

After fulfillment of the exit condition, i.e., after completion of the execution of the process in the sandbox, the first log 137 may be transferred onto a computer to the first log 122, and the dump database 136 may be transferred to the dump database 121. In step 207, the antivirus application 110 may identify in the first log 122 one or more signatures of a first type. Each signature of the first type may include a data structure containing at least one record, containing in turn information about an API function call or information about a suspicious event.

After identifying the signature of the first type, in step 208 the antivirus application 110 may send one or more saved memory dumps to the emulator 111 for execution, and during the execution in the emulator 111 there may be a consecutive entering in the second log 125 of records about the API function calls or a record of the execution trace of the process. The execution trace of the process may contain the uninterrupted sequence of instructions being executed on the processor and snapshots of the internal state of the processor during the execution of each instruction.

The emulator 111 may disassemble the executable code contained in the memory dumps and executes it in its virtual environment.

A signature of the second type may include a data structure containing at least one of the records: information about API function calls, processor instructions, and records of snapshots of the internal state of the processor.

As a result, in step 209 the antivirus application 110 may be configured to determine a malicious code in the file upon identification in the second log 125 of one or more signatures of a second type. A signature of the second type may include a data structure containing at least one of the records: information about API function calls, processor instructions, and records of snapshots of the internal state of the processor.

Based on the foregoing, the disclosed system and method make it possible to detect a malicious code in those files in which the existing methods of detection are not always able to detect it.

Figure 3:
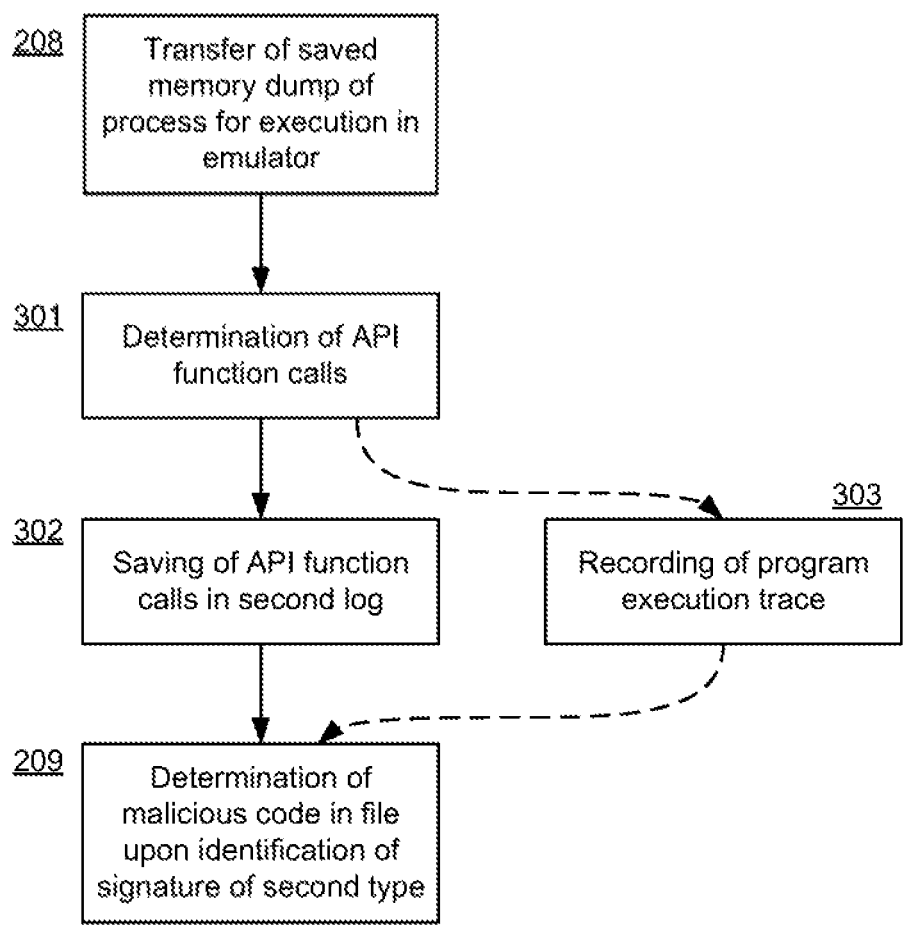
FIG. 3 shows a more detailed exemplary method for execution of a process on an emulator, according to aspects of the invention.

FIG. 3 presents a detailed method for execution of a process on an emulator in step 208, according to aspects of the invention. During the execution of the process, in step 301, the emulator 111 may determine jumps at the addresses of API function calls (such as the call CreateFile operator, transferring control to the API function CreateFile). In one example, in step 302, the emulator 111 may successively enter the records about the API function calls in the second log 125.

In yet another exemplary aspect, after step 301 comes step 303, during which the antivirus application 110 may determine and write the execution trace of the process into the second log 125 during the execution of the process on the emulator 111. The execution trace of the process may contain the uninterrupted sequence of instructions being executed on the processor and snapshots of the internal state of the processor when executing each instruction. In this case, the signature of the second type may contain processor instructions and records of snapshots of the internal state of the processor.

In yet another exemplary aspect, only the instructions pertaining to the process launched from the file 134 being checked may be selected from the execution trace of the process. The instructions pertaining to the execution of processes of the operating system may be removed from the execution trace of the process.

As a result, after step 302 or step 303 respectively, in step 209 the antivirus application 110 may determine a malicious code in the file 134 upon identification in the second log 125 of one or more signatures of a second type. A signature of the second type may include a data structure containing at least one of the records: information about API function calls, processor instructions, and records of snapshots of the internal state of the processor.

In one exemplary aspect, a signature of the second type may contain records containing information about API function calls and a processor instruction and records of snapshots of the internal state of the processor at the same time.

In yet another exemplary aspect, a signature of the second type may additionally contain conditions imposed on other records of this same signature—API function calls, processor instructions and records of snapshots of the internal state of the processor. Such conditions may include, for example: checking of the number of records of the signature, checking of the sequence of the records of the signature, and so forth.

A more detailed description of signatures of the second type has been given above, in the description of FIG. 1.

Figure 4:
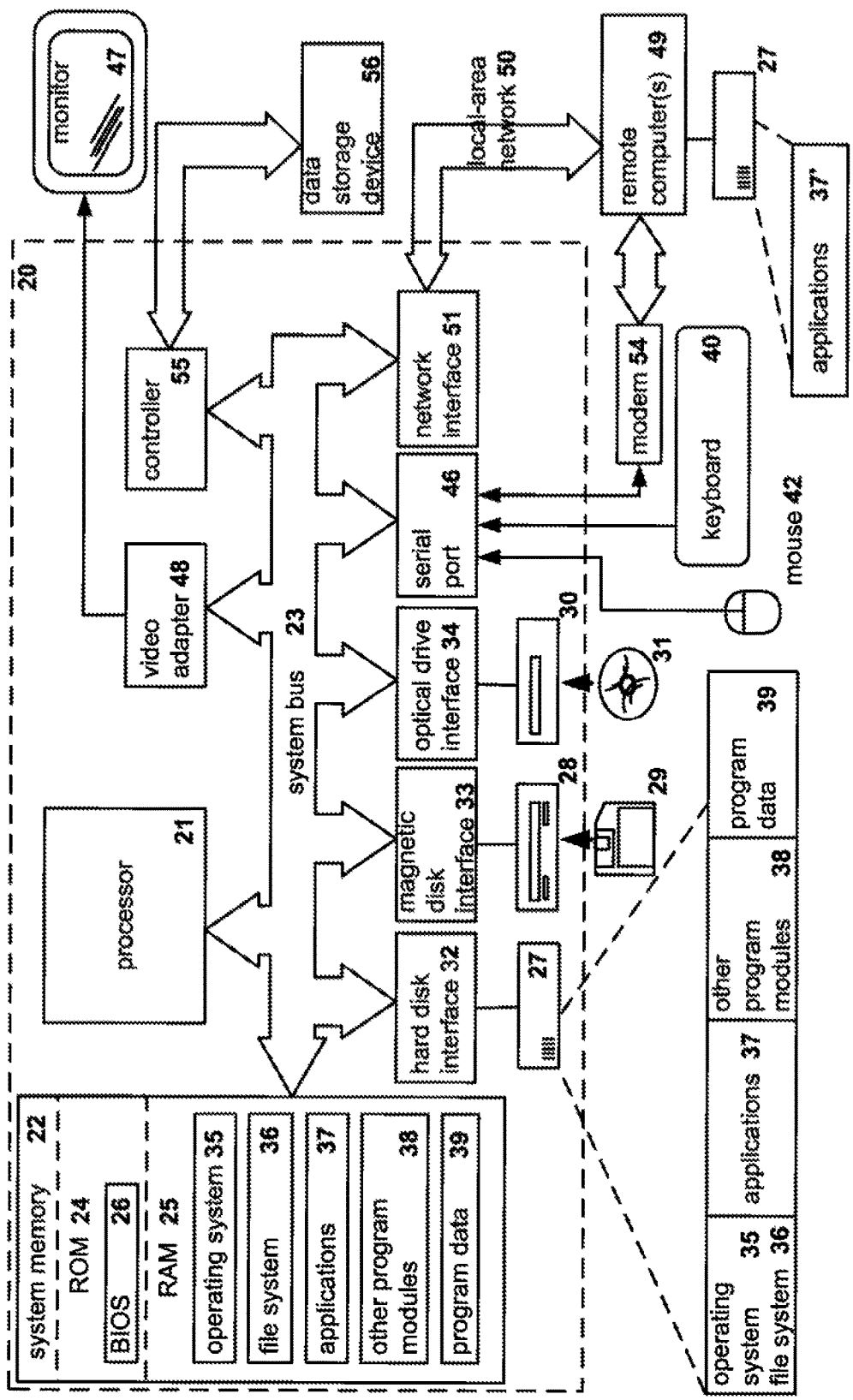
FIG. 4 illustrates an example of a general-purpose computer system on which the aspects of the systems and methods of detecting malicious code in files can be implemented.

FIG. 4 is a diagram illustrating a general-purpose computer system on which aspects of systems and methods for system and method for detecting malicious code in files may be implemented in accordance with an exemplary aspect. As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, supra). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for detecting malicious code in files, the method comprising:
   intercepting, by a processor, one or more application program interface (API) calls during an execution of a process launched from a file of a computing device;
   detecting, by the processor, a fulfillment of an exit condition of the process, wherein the exit condition is based on weights assigned to types of suspicious events;
   in response to detecting the exit condition, identifying one or more signatures of a first type and transferring one or more saved memory dumps of the computing device to an emulator for execution, wherein the execution of the transferred one or more saved memory dumps of the computing device in the emulator comprises disassembling one or more executable codes contained in the one or more saved memory dumps and maintaining in succession in a second log records of the intercepted API calls, wherein each record in the second log contains information for an API function called, the information including a unique identifier (PID) of a process launched from a corresponding file; and
   identifying a malicious code in the file in response to detecting one or more signatures of a second type based at least upon execution results of the transferred memory dumps of the computing device.

2. The computer-implemented method of claim 1, further comprising:
   executing the process launched from the file in a virtual machine of the computing device via a control of an antivirus application installed on the computing device.

3. The computer-implemented method of claim 2, further comprising:
   determining and storing successive records of the intercepted API calls in a first log of the virtual machine of the computing device.

4. The computer-implemented method of claim 1, wherein the detecting, by the processor, of the fulfillment of the exit condition of the process comprises: detecting at least one of: an indication that the process has been completed; a specified period of time has elapsed; a number of instructions executed by the process has exceeded a selected threshold; or a number of detected suspicious events has exceeded a selected threshold.

5. The computer-implemented method of claim 3, further comprising:
   detecting one or more suspicious events occurring during the execution of the process based on the intercepted API calls; and
   in response to detecting the one or more suspicious events and storing the successive records of the intercepted API calls in the first log, storing a memory dump of the execution of the process based on the intercepted API calls, the storing being in a database of the virtual machine of the computing device.

6. The computer-implemented method of claim 5, wherein identifying the one or more signatures of the first type is performed based at least on the successive records in the first log, each signature of the first type comprising a data structure containing at least one record having information relating to the intercepted API calls or the detected one or more suspicious events.

7. The computer-implemented method of claim 1, wherein the execution of the transferred one or more saved memory dumps of the computing device in the emulator further comprises:
    executing the one or more executable codes in a virtual environment of the emulator; and
    determining jumps to addresses of the intercepted API calls during the execution of the one or more executable codes.

8. The computer-implemented method of claim 7, wherein each record in the second log further contains the following information for the API function called: a name of the API function called; a unique identifier (TID) of a thread executing instructions of address space of the process launched from the corresponding file; and a set of arguments of the API function called.

9. The computer-implemented method of claim 7, wherein the second log is configured to maintain and record an execution trace of the emulator including an uninterrupted sequence of instructions being executed on the processor and snapshots of internal states of the processor when executing each instruction.

10. The computer-implemented method of claim 9, wherein the one or more signatures of the second type comprise a data structure containing at least one of the records in the second log: information about the intercepted API calls, processor instructions, and records of snapshots of the internal states of the processor.

11. A system for detecting malicious code in files, comprising:
    at least one processor configured to:
        intercept one or more application program interface (API) calls during an execution of a process launched from a file of a computing device;
        determine and detect a fulfillment of an exit condition of the process, wherein the exit condition is based on weights assigned to types of suspicious events;
        in response to detecting the exit condition, identify one or more signatures of a first type and transfer one or more saved memory dumps of the computing device to an emulator for execution, wherein the execution of the transferred one or more saved memory dumps of the computing device in the emulator comprises disassembling one or more executable codes contained in the one or more saved memory dumps and maintaining in succession in a second log records of the intercepted API calls, wherein each record in the second log contains information for an API function called, the information including a unique identifier (PID) of a process launched from a corresponding file; and
        determine and identify a malicious code in the file in response to detecting one or more signatures of a second type based at least upon execution results of the transferred memory dumps of the computing device.

12. The system of claim 11, wherein the processor is further configured to:
    execute the process launched from the file in a virtual machine of the computing device via a control of an antivirus application installed on the computing device; and
    determine and store successive records of the intercepted API calls in a first log of the virtual machine of the computing device.

13. The system of claim 11, wherein, to detect the fulfillment of the exit condition of the process, the processor is configured to detect at least one of: an indication that the process has been completed; a specified period of time has elapsed; a number of instructions executed by the process has exceeded a selected threshold; or a number of detected suspicious events has exceeded a selected threshold.

14. The system of claim 12, wherein the processor is further configured to:
    detect one or more suspicious events occurring during the execution of the process based on the intercepted API calls; and
    in response to detecting the one or more suspicious events and storing the successive records of the intercepted API calls in the first log, store a memory dump of the execution of the process based on the intercepted API calls, the storing being in a database of the virtual machine of the computing device.

15. The system of claim 14, wherein the processor is configured to identify the one or more signatures of the first type based at least on the successive records in the first log, each signature of the first type comprising a data structure containing at least one record having information relating to the intercepted API calls or the detected one or more suspicious events.

16. The system of claim 11, wherein, to execute the transferred one or more saved memory dumps of the computing device in the emulator, the processor is further configured to:
    execute the one or more executable codes in a virtual environment of the emulator; and
    determine jumps to addresses of the intercepted API calls during the execution of the one or more executable codes.

17. The system of claim 16, wherein each record in the second log further contains the following information for the API function called: a name of the API function called; a unique identifier (TID) of a thread executing instructions of address space of the process launched from the corresponding file; and a set of arguments of the API function called.

18. The system of claim 16, wherein the second log is configured to maintain and record an execution trace of the emulator including an uninterrupted sequence of instructions being executed on the processor and snapshots of internal states of the processor when executing each instruction, and wherein the one or more signatures of the second type comprise a data structure containing at least one of the records in the second log: information about the intercepted API calls, processor instructions, and records of snapshots of the internal states of the processor.

19. A non-transitory computer readable medium storing thereon computer executable instructions for detecting malicious code in files, including instructions for:
    intercepting, by a processor, one or more application program interface (API) calls during an execution of a process launched from a file of a computing device;

determining and detecting, by the processor, a fulfillment of an exit condition of the process, wherein the exit condition is based on weights assigned to types of suspicious events;

in response to detecting the exit condition, identifying one or more signatures of a first type and transferring one or more saved memory dumps of the computing device to an emulator for execution, wherein the execution of the transferred one or more saved memory dumps of the computing device in the emulator comprises disassembling one or more executable codes contained in the one or more saved memory dumps and maintaining in succession in a second log records of the intercepted API calls, wherein each record in the second log contains information for an API function called, the information including a unique identifier (PID) of a process launched from a corresponding file; and determining and identifying a malicious code in the file in response to detecting one or more signatures of a second type based at least upon execution results of the transferred memory dumps of the computing device.

20. The computer readable medium of claim 19, further comprising instructions for:

executing the process launched from the file in a virtual machine of the computing device via a control of an antivirus application installed on the computing device; and determining and storing successive records of the intercepted API calls in a first log of the virtual machine of the computing device.

* * * * *